US009558761B2

(12) United States Patent
Lehtiniemi et al.

(10) Patent No.: US 9,558,761 B2
(45) Date of Patent: Jan. 31, 2017

(54) CAUSATION OF RENDERING OF SONG AUDIO INFORMATION BASED UPON DISTANCE FROM A SOUND SOURCE

(71) Applicant: NOKIA TECHNOLOGIES OY, Espoo (FI)

(72) Inventors: Arto Lehtiniemi, Lempaala (FI); Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/637,340

(22) Filed: Mar. 3, 2015

(65) Prior Publication Data
US 2015/0248896 A1 Sep. 3, 2015

(30) Foreign Application Priority Data
Mar. 3, 2014 (EP) .................................... 14157410

(51) Int. Cl.
*G10L 25/51* (2013.01)
*G10L 25/54* (2013.01)
*G06F 17/30* (2006.01)
*G10L 21/10* (2013.01)
*G10L 21/18* (2013.01)

(52) U.S. Cl.
CPC ......... *G10L 21/10* (2013.01); *G06F 17/30755* (2013.01); *G06F 17/30758* (2013.01); *G10L 21/18* (2013.01); *G10L 25/51* (2013.01); *G10L 25/54* (2013.01)

(58) Field of Classification Search
CPC .......... G10L 21/10; G10L 21/18; G10L 25/51; G10L 25/54; G10L 25/81; G04H 40/81; G10H 225/311; G06F 17/30755; G06F 17/30758

USPC .......................................... 704/231, 235, 270
See application file for complete search history.

(56) References Cited

U.S. PATENT DOCUMENTS

| 5,699,432 A * | 12/1997 | Schneider ............ H04B 1/1661 381/11 |
| 8,831,761 B2 * | 9/2014 | Kemp .................. G10L 19/008 370/260 |
| 8,954,834 B1 * | 2/2015 | Everson .................. G06F 15/16 709/248 |
| 2003/0023421 A1 | 1/2003 | Finn et al. |

(Continued)

FOREIGN PATENT DOCUMENTS

WO 03063025 A2 7/2003

OTHER PUBLICATIONS

Anonymous, "Mobile Client SDK for Android Developer's Guide Getting Started with the Android Sample Application Introduction", Aug. 1, 2013, pp. 1-84.

(Continued)

*Primary Examiner* — James Wozniak
(74) *Attorney, Agent, or Firm* — Banner & Witcoff, Ltd.

(57) ABSTRACT

A method comprising receiving microphone audio information from at least one microphone, identifying a song based, at least in part, on the microphone audio information, receiving song audio information based, at least in part, on the identification of the song, causing display of, at least a portion of, a song indicator that represents the song, receiving information indicative of a song rendering input in relation to the song indicator, and causing rendering of the song audio information based, at least in part, on the song rendering input is disclosed.

21 Claims, 11 Drawing Sheets

(56) References Cited

U.S. PATENT DOCUMENTS

| | | | | |
|---|---|---|---|---|
| 2005/0254640 | A1* | 11/2005 | Ohki | H04R 3/02 379/406.1 |
| 2007/0087686 | A1* | 4/2007 | Holm | H04S 7/30 455/3.06 |
| 2008/0052624 | A1* | 2/2008 | Roberts | H04N 5/4403 715/716 |
| 2008/0109867 | A1* | 5/2008 | Panabaker | H04W 12/08 726/1 |
| 2008/0155062 | A1* | 6/2008 | Rabold | H04L 29/06027 709/219 |
| 2008/0207115 | A1* | 8/2008 | Lee | H04M 1/7253 455/3.06 |
| 2009/0214010 | A1* | 8/2009 | Langgood | H04R 27/00 379/110.01 |
| 2009/0215439 | A1* | 8/2009 | Hamilton | H04M 1/605 455/418 |
| 2010/0092007 | A1* | 4/2010 | Sun | G10L 25/00 381/92 |
| 2010/0141839 | A1* | 6/2010 | Supran | G06F 1/1632 348/553 |
| 2010/0268360 | A1* | 10/2010 | Ingrassia | G06F 17/30749 700/94 |
| 2011/0153044 | A1* | 6/2011 | Lindahl | G06F 3/167 700/94 |
| 2011/0276333 | A1* | 11/2011 | Wang | G06F 17/30861 704/270 |
| 2013/0024018 | A1* | 1/2013 | Chang | G08C 17/02 700/94 |
| 2013/0094666 | A1* | 4/2013 | Haff | H04N 21/4126 381/104 |
| 2013/0132845 | A1* | 5/2013 | Tammi | G01S 3/8006 715/728 |
| 2013/0188798 | A1* | 7/2013 | Togawa | H04B 3/20 381/66 |
| 2013/0275873 | A1* | 10/2013 | Shaw | G01S 3/8006 715/716 |
| 2014/0004799 | A1* | 1/2014 | Masuda | H04W 52/0225 455/41.2 |
| 2014/0092212 | A1* | 4/2014 | Ito | H04N 21/42203 348/43 |
| 2014/0173057 | A1* | 6/2014 | Dong | H04N 21/43 709/219 |
| 2014/0225931 | A1* | 8/2014 | Plagemann | G06T 3/40 345/660 |
| 2014/0268008 | A1* | 9/2014 | Howell | G02C 5/143 351/111 |
| 2014/0279889 | A1* | 9/2014 | Luna | G06F 17/30575 707/626 |
| 2014/0294183 | A1* | 10/2014 | Lee | H04R 3/005 381/56 |
| 2014/0376728 | A1* | 12/2014 | Ramo | G06T 19/006 381/56 |
| 2015/0095170 | A1* | 4/2015 | Lang | G06Q 20/20 705/16 |
| 2015/0172262 | A1* | 6/2015 | Ortiz, Jr. | H04W 12/04 726/4 |
| 2015/0172463 | A1* | 6/2015 | Quast | H04M 3/4936 379/88.01 |
| 2015/0245133 | A1* | 8/2015 | Kim | H04R 1/326 381/92 |
| 2015/0248896 | A1* | 9/2015 | Lehtiniemi | G06F 17/30758 704/235 |
| 2015/0296319 | A1* | 10/2015 | Shenoy | H04S 7/302 381/303 |
| 2015/0379687 | A1* | 12/2015 | Plagemann | G06T 3/40 345/660 |

OTHER PUBLICATIONS

Sallai et al., "Acoustic Shockwave-Based Bearing Estimation", Proceedings of the 12th International Conference on Information Processing in Sensor Networks, Apr. 8, 2013, pp. 217-228.

Anonymous, "Find That Sound Fur IPad und IPhone", Jan. 1, 2013, pp. 1-4.

European Search Report of corresponding European Patent Application No. 14157410.3, dated Sep. 3, 2014, 8 pages.

\* cited by examiner

CAUSATION OF RENDERING OF SONG AUDIO INFORMATION BASED UPON DISTANCE FROM A SOUND SOURCE

RELATED APPLICATION

This application claims priority to European Application No. 14157410.3 filed Mar. 3, 2014, which is incorporated herein by reference in its entirety.

TECHNICAL FIELD

The present application relates generally to causation of rendering of song audio information.

BACKGROUND

In recent years, electronic apparatuses have becoming increasingly pervasive in our society. Users of electronic apparatuses have become increasingly reliant upon their electronic apparatuses, and utilize their electronic apparatuses in a wide variety of manners. For example, a user of an electronic apparatus may store music by way of the electronic apparatus, stream music from a music streaming service, and/or the like.

SUMMARY

Various aspects of examples of the invention are set out in the claims.

One or more embodiments may provide an apparatus, a computer readable medium, a non-transitory computer readable medium, a computer program product, and a method for receiving microphone audio information from at least one microphone, identifying a song based, at least in part, on the microphone audio information, receiving song audio information based, at least in part, on the identification of the song, causing display of, at least a portion of, a song indicator that represents the song, receiving information indicative of a song rendering input in relation to the song indicator, and causing rendering of the song audio information based, at least in part, on the song rendering input.

One or more embodiments may provide an apparatus, a computer readable medium, a computer program product, and a non-transitory computer readable medium having means for receiving microphone audio information from at least one microphone, means for identifying a song based, at least in part, on the microphone audio information, means for receiving song audio information based, at least in part, on the identification of the song, means for causing display of, at least a portion of, a song indicator that represents the song, means for receiving information indicative of a song rendering input in relation to the song indicator, and means for causing rendering of the song audio information based, at least in part, on the song rendering input.

An apparatus comprising at least one processor and at least one memory, the memory comprising machine-readable instructions, that when executed cause the apparatus to perform receipt of microphone audio information from at least one microphone, identification of a song based, at least in part, on the microphone audio information, receipt of song audio information based, at least in part, on the identification of the song, causation of display of, at least a portion of, a song indicator that represents the song, receipt of information indicative of a song rendering input in relation to the song indicator, and causation of rendering of the song audio information based, at least in part, on the song rendering input.

In at least one example embodiment, the identification of the song comprises determination that the microphone audio information is indicative of the song.

In at least one example embodiment, the determination that the microphone audio information is indicative of the song comprises sending of at least a portion of the microphone audio information to a separate apparatus, and receipt of information indicative of the song from the separate apparatus.

One or more example embodiments further perform determination of a song timestamp that corresponds with a rendering position of the song with reference to the microphone audio information, such that the song timestamp identifies song timestamp audio information of the microphone audio information and song timestamp audio information of the song audio information.

In at least one example embodiment, the causation of rendering of the song audio information is performed such that the timestamp audio information of the song audio information is synchronized with the timestamp audio information of the microphone audio information.

In at least one example embodiment, the song is a data structure that signifies the song audio information.

In at least one example embodiment, the song comprises information indicative of at least one of a song title, a song type, an artist name, an artist image, an album title, an album cover, a genre, or a production year.

In at least one example embodiment, the song audio information is audio information that represents the content of the song.

In at least one example embodiment, the content of the song comprises at least one of music content, audio effect content, or voice content.

One or more example embodiments further perform determination of a direction of the microphone audio information, wherein causation of display of the song indicator is based, at least in part, on the direction of the microphone audio information.

In at least one example embodiment, the determination of the direction of the microphone audio information comprises determination of the direction of the microphone audio information based, at least in part, on correlation between audio information associated with a plurality of microphones at different positions on the apparatus.

In at least one example embodiment, the determination of the direction of the microphone audio information comprises determination of the direction of the microphone audio information based, at least in part, on a unitary audio source presumption.

In at least one example embodiment, the microphone is a directional microphone, the microphone audio information is directional audio information, and the determination of the direction of the microphone audio information comprises determination of the direction of the microphone audio information based, at least in part, on the directional audio information.

In at least one example embodiment, the directional microphone is a microphone that is associated with a direction.

In at least one example embodiment, the directional audio information is audio information associated with sound waves approaching the apparatus from the direction.

In at least one example embodiment, the directional microphone is positioned on the apparatus such that the directional microphone is more sensitive in the direction than in a different direction.

In at least one example embodiment, the microphone is an omnidirectional microphone, the microphone audio information is omnidirectional audio information, and the determination of the direction of the microphone audio information comprises determination of the direction of the microphone audio information based, at least in part, on correlation between omnidirectional audio information associated with a plurality of microphones at different positions on the apparatus.

In at least one example embodiment, the causation of display of the song indicator comprises display of the song indicator at a display position on a display.

In at least one example embodiment, the display position is a position on the display that is in a display direction from the geometric center of the display.

In at least one example embodiment, the display direction, at least partially, corresponds with the direction of the microphone audio information.

In at least one example embodiment, the display position of the song indicator is indicative of the direction of the microphone audio information.

In at least one example embodiment, the causation of rendering of the song audio information is based, at least in part, on the direction of the microphone audio information.

In at least one example embodiment, the direction of the microphone audio information is to a side of the apparatus, and the rendering of the song audio information comprises rendering of the song audio information by way of at least one speaker such that the rendering of the song audio information correlates with the side of the apparatus.

In at least one example embodiment, the song rendering input is a tap input associated with the song indicator.

In at least one example embodiment, the causation of display of the song indicator comprises display of the song indicator at a display position on a display, and the tap input is at a position on the display that corresponds with the display position of the song indicator on the display.

In at least one example embodiment, the song rendering input is a drag input.

In at least one example embodiment, the drag input comprises a contact portion of the drag input, a movement portion of the drag input, and a release portion of the drag input.

In at least one example embodiment, the causation of display of the song indicator comprises display of the song indicator at a display position on a display, and the contact portion of the drag input is at a position on the display that corresponds with the display position of the song indicator on the display.

In at least one example embodiment, the movement portion of the drag input is associated with movement across the display towards a position on the display that approximately corresponds with a geometric center of the display.

In at least one example embodiment, the release portion of the drag input is at a position on the display that approximately corresponds with a geometric center of the display.

In at least one example embodiment, the release portion of the drag input is at a position on the display that corresponds with a rendering indicator.

One or more example embodiments further perform causation of display of the rendering indicator.

One or more example embodiments further perform determination of a first magnitude of the microphone audio information, wherein the rendering of the song audio information is based, at least in part, on the first magnitude, determination of a second magnitude of the microphone audio information subsequent to the causation of rendering of the song audio information, and causation of continuation of rendering of the song audio information based, at least in part, on the second magnitude.

In at least one example embodiment, the first magnitude is greater than the second magnitude, the rendering of the song audio information is a lower volume rendering, and the further rendering of the song audio information is a higher volume rendering.

In at least one example embodiment, the first magnitude is greater than the second magnitude, the rendering of the song audio information is a monophonic rendering, and the further rendering of the song audio information is a stereophonic rendering.

One or more example embodiments further perform causation of intermediate rendering of the song audio information subsequent to the rendering of the song audio information and prior to the further rendering of the song audio information.

In at least one example embodiment, the intermediate rendering is performed such that the monophonic rendering transitions to the stereophonic rendering in proportion to a rendering transition duration.

In at least one example embodiment, the transition to the stereophonic rendering comprises increase of rendering volume in a plurality of speakers in proportion to elapse of time during the rendering transition duration.

In at least one example embodiment, the receipt of the song audio information comprises receipt of the song audio information from at least one memory comprised by the apparatus.

In at least one example embodiment, the receipt of the song audio information comprises receipt of the song audio information from a separate apparatus.

In at least one example embodiment, the receipt of the song audio information from a separate apparatus comprises receipt of a file comprising the song audio information from the separate apparatus.

In at least one example embodiment, the receipt of the song audio information from a separate apparatus comprises receipt of a stream of song audio information from the separate apparatus.

In at least one example embodiment, the song indicator is a visual representation of at least one of a shape, a play button, a song title, a song type, an artist name, an artist image, an album title, an album cover, a genre, or a production year.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
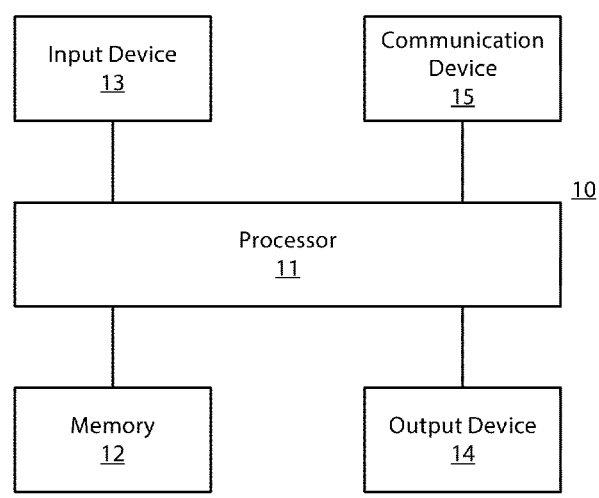
FIG. 1 is a block diagram showing an apparatus according to at least one example embodiment.

An embodiment of the invention and its potential advantages are understood by referring to FIGS. 1 through 10 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
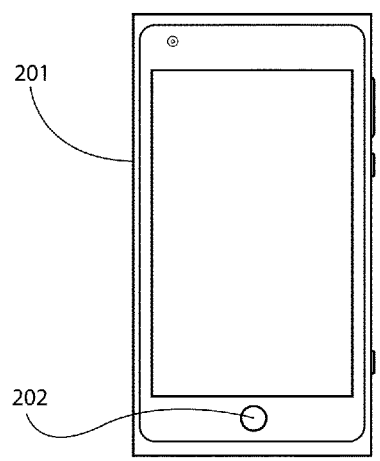
FIGS. 2A-2C are diagrams illustrating at least one microphone of an apparatus according to at least one example embodiment.
Figure 2B:
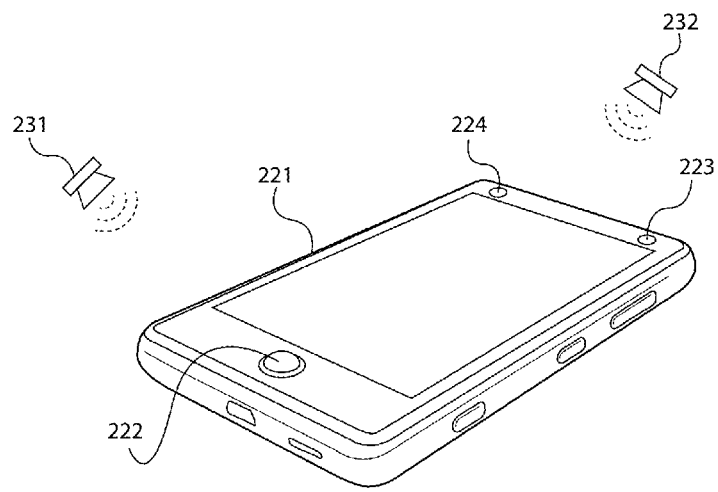
Figure 2C:
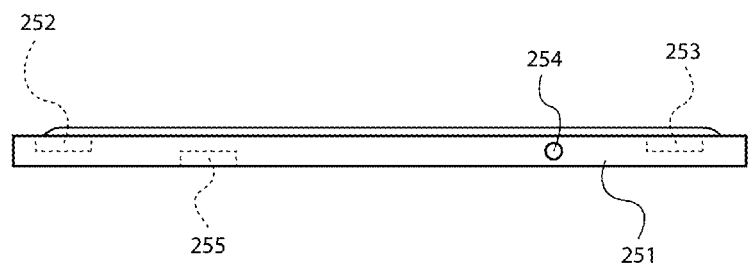

FIGS. 2A-2C are diagrams illustrating at least one microphone of an apparatus according to at least one example embodiment. The examples of FIGS. 2A-2C are merely examples and do not limit the scope of the claims. For example, number of microphones may vary, placement of microphones may vary, housing of the apparatus may vary, and/or the like.

Users utilize electronic apparatuses for a variety of purposes and in numerous types of situations. For example, a user may utilize the user's electronic apparatus to talk to a friend, to record a voice memo, listen to audio information, and/or the like. As such, it may be desirable to configure an apparatus such that the apparatus comprises one or more microphones, one or more speakers, and/or the like.

FIG. 2A is a diagram illustrating microphone 202 of apparatus 201 according to at least one example embodiment. It can be seen that microphone 202 is positioned on apparatus 202 such that microphone 202 may receive audio information proximate to the mouth of a user when speaking into apparatus 201. The positioning may be such that microphone 202 is proximate to the mouth of the user when the user holds apparatus 201 while talking to an individual by way of apparatus 201, while listening to a voice memo by way of apparatus 201, and/or the like. In at least one example embodiment, apparatus 201 receives audio information from microphone 202.

In some circumstances, it may be desirable to receive audio information that may originate from the environment surrounding an apparatus, a user of the apparatus, and/or the like. For example, a user may desire to record audio information associated with a lecture, a presentation, a concert, a musical performance, and/or the like. As such, it may be desirable to configure an apparatus such that the apparatus may receive audio information associated with the environment surrounding the apparatus. In at least one example embodiment, the audio information is audio information associated with a plurality of microphones. One or more of the microphones may be comprised by the apparatus. One or more microphones may be separate from the apparatus, such as a separate apparatus that provides the apparatus with audio information.

In at least one example embodiment, audio information is directional audio information. In at least one example embodiment, directional audio information is audio information associated with sound waves approaching the apparatus from a specified direction. The apparatus may determine directional audio information based, at least in part, on correlation between audio information associated with a plurality of microphones at different positions on the apparatus. For example, the apparatus may evaluate audio information associated with a plurality of microphones, and correlate the audio information based, at least in part, on information indicative of the position of the plurality of the microphones on the apparatus such that the audio information indicative of an audio source at a specified direction from the apparatus is favored over audio from other directions. In at least one example embodiment, determination of directional audio information comprises conversion of omnidirectional audio information to directional audio information.

FIG. 2B is a diagram illustrating a plurality of microphones of an apparatus according to at least one example embodiment. In the example of FIG. 2B, apparatus 221 comprises microphones 222, 223, and 224. In the example of FIG. 2B, microphones 222, 223, and 224 are receiving audio information from sound sources 231 and 232. It can be seen that sound source 232 is closer to microphones 223 and 224 than sound source 231. It can be seen that sound source 231 is closer to microphone 222 than sound source 232. In at least one example embodiment, apparatus 221 receives audio information from microphones 222, 223, and 224, and determines directional audio information based on the audio information. For example, the apparatus may determine directional audio indicative of a direction that corresponds with audio source 231. In such an example, the apparatus may identify audio information associated with audio source 231 by way of time associated with audio information associated with microphone 222 versus time associated with audio information associated with microphone 223, versus time associated with audio information associated with microphone 224. In such an example, the directional audio information may be indicative of extraction of sound associated with the predetermined direction, limitation of sound associated with a direction that does not correspond with the predetermined direction, and/or the like.

In at least one example embodiment, the directional audio information is determined based, at least in part, on a unitary audio source presumption. For example, the directional audio information may be based on a presumption that sound that is desired to be included in the directional audio information is associated with a single direction. In this manner, the directional audio information may relate to sounds associated with a predetermined direction.

The arrangement of microphones 222, 223, 224 in FIG. 2B is provided for ease of illustration. In practice, a suitable apparatus may comprise a different number of microphones, and/or microphones in different locations. For example, the apparatus may comprise a first microphone that is located towards the bottom of a front side of the device so as to be positioned close to the user's mouth when the apparatus is in use, and a second microphone positioned towards the top of a rear side of the device.

In some circumstances, determining audio information may be associated with favoring audio information associated with one or more microphones, such as one or more microphones facing a particular direction, over audio information associated with one or more microphones facing a different direction. For example, a microphone may be associated with a direction and a different microphone may be associated with a different direction. For example, if the microphones are directional then they may be positioned such that the microphones are most sensitive in different directions, and whether directional or omnidirectional the microphones may be located in different locations whereby they are directed differently in the sense that they are positioned at different distances from potential sound sources and/or with different obstructions between the microphones and the sound sources.

FIG. 2C is a diagram illustrating a plurality of microphones of an apparatus according to at least one example embodiment. In the example of FIG. 2C, apparatus 251 comprises a plurality of microphones. It can be seen that microphones 252 and 253 are at different positions on the same face of apparatus 251, that microphone 255 is on the opposite face of apparatus 251 from microphones 252 and 253, and that microphone 254 is on the side of apparatus 251.

Figure 3A:
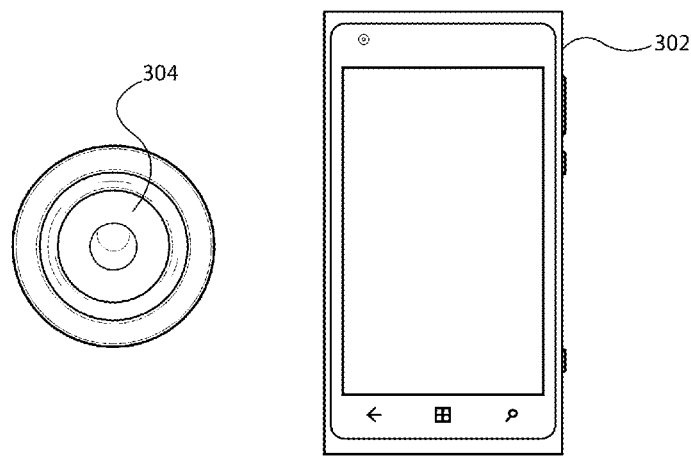
FIGS. 3A-3B are diagrams illustrating receipt of microphone audio information according to at least one example embodiment.
Figure 3B:
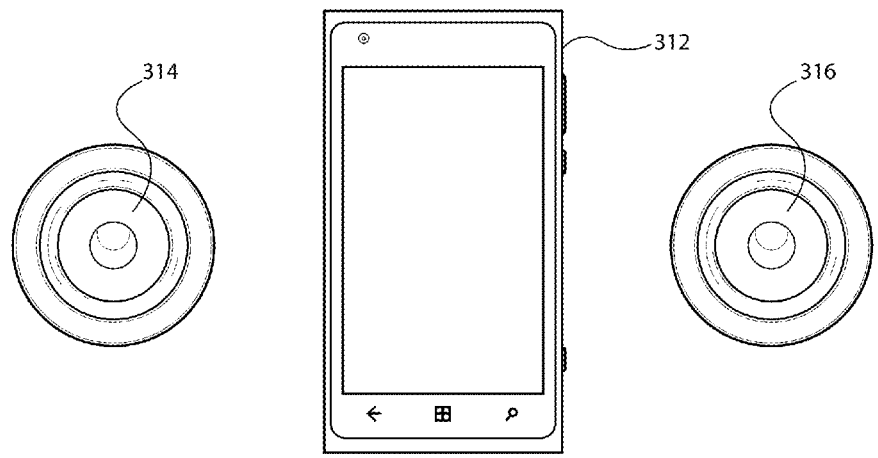

FIGS. 3A-3B are diagrams illustrating receipt of microphone audio information according to at least one example embodiment. The examples of FIGS. 3A-3B are merely examples and do not limit the scope of the claims. For example, apparatus configuration may vary, apparatus orientation may vary, speaker location may vary, speaker count may vary, and/or the like.

As discussed previously, in many circumstances, a user of an apparatus may be in a location in which there are a wide range of ambient sounds, conversations, and/or the like. For example, a user may be walking in a city and may be exposed to different types of music. In such an example, the user may enjoy a particular song that the user hears while walking around the city. In such an example, the user may desire to remain stationary and listen to the song, but may be unable to do so due to the user's schedule, sidewalk traffic, and/or the like. As such, it may be desirable to configure an electronic apparatus such that the electronic apparatus may identify a song that may be playing in the environment surrounding the user and cause rendering of the song. In some circumstances, it may be desirable to render the song in such a way that naturally blends the rendering of the song by the apparatus with the environmental rendering of the song. In this manner, the user may be able to listen to the entirety of the song without having to stop and remain stationary.

In order to facilitate identification of auditory information indicative of a song being rendered in the environment surrounding a user of an electronic apparatus, it may be desirable to detect such auditory information, receive such auditory information from one or more microphones, and/or the like. In at least one example embodiment, an apparatus receives microphone audio information from at least one microphone. The microphone may be similar as described regarding FIGS. 2A-2C.

FIG. 3A is a diagram illustrating receipt of microphone audio information according to at least one example embodiment. The example of FIG. 3A illustrates apparatus 302 proximate to speaker 304. Speaker 304 may be playing a song such that auditory information associated with the song may be received by way of one or more microphones comprised by apparatus 302. As can be seen, speaker 304 is located to the left of apparatus 302. As such, apparatus 302 may receive microphone audio information that corresponds with the song being played by way of speaker 304, may determine that speaker 304 is located to the left of apparatus 302, and/or the like.

In some circumstances, more than one song may be playing in the environment surrounding a user of an electronic apparatus. As such, it may be desirable to configure the electronic apparatus such that the electronic apparatus may distinguish between two or more audio sources, two or more songs, and/or the like. For example, a song may be playing on a speaker that is located to the left of a user, and a different song may be playing on a different speaker that is located to the right of the user. In such an example, it may be desirable to configure the electronic apparatus such that the electronic apparatus may localize the source of the auditory information associated with the song, may determine a direction from which the auditory information is being received, and/or the like. In this manner, the electronic apparatus may differentiate between two or more sources, songs, and/or the like. In at least one example embodiment, an apparatus determines a direction of the microphone audio information. For example, the apparatus may determine the direction of the microphone audio information based, at least in part, on correlation between audio information associated with a plurality of microphones at different positions on the apparatus. The determination of the direction of the microphone audio information may be similar as described regarding FIGS. 2A-2C.

FIG. 3B is a diagram illustrating receipt of microphone audio information according to at least one example embodiment. The example of FIG. 3B illustrates apparatus 312 proximate to speaker 314 and speaker 316. Speaker 314 may be playing a song such that auditory information associated with the song may be received by way of one or more microphones comprised by apparatus 312, and speaker 316 may be playing a different song such that auditory information associated with the different song may be received by way of one or more microphones comprised by apparatus 312. As can be seen, speaker 314 is located to the left of apparatus 312, and speaker 316 is located to the right of apparatus 312. As such, apparatus 312 may receive microphone audio information that corresponds with the song being played by way of speaker 314, may determine that speaker 314 is located to the left of apparatus 312, and/or the like. Similarly, apparatus 312 may receive microphone audio information that corresponds with the song being played by way of speaker 316, may determine that speaker 316 is located to the right of apparatus 312, and/or the like.

As discussed previously, in many circumstances, the environment surrounding a user of an electronic apparatus may be associated with a wide range of environmental noise, ambient sounds, and/or the like, in addition to auditory information associated with music, a song, and/or the like. As such, it may be desirable to configure an electronic apparatus such that the electronic apparatus may determine that a song is being playing in the environment surrounding the user, the apparatus, and/or the like. In at least one example embodiment, an apparatus identifies a song based, at least in part, on microphone audio information. Identification of the song may, for example, comprise determination that the microphone audio information is indicative of the song. There are currently many manners in which an apparatus may determine that microphone audio information is indicative of a song, and there will likely be many more manners in the future. As such, the manner in which the apparatus determines that the microphone audio information is indicative of the song does not limit the scope of the claims.

For example, the apparatus may send at least a portion of the microphone audio information to a separate apparatus, and receive information indicative of the song from the separate apparatus. For example, the separate apparatus may be a server, a database, a music server, streaming music platform, a music database service, a song identification platform, a music recognition service, and/or the like. In such an example, the separate apparatus, or a different separate apparatus associated with the separate apparatus, may identify a particular song within microphone audio information, and send information indicative of the song to the apparatus. The song may be identified by way of beat mapping, acoustical fingerprinting, time-frequency matching, lyrical correlation, and/or the like.

In many circumstances, a user may desire to be aware of the identity of the song that is being played in the environment surrounding the user. For example, the user may desire to purchase physical media associated with the song, to download the song from a music service, and/or the like. As such, it may be desirable to configure an electronic apparatus such that the electronic apparatus may identify information associated with the song. As discussed previously, in at least one example embodiment, the apparatus sends at least a portion of the microphone audio information to a separate apparatus, and receives information indicative of the song from the separate apparatus. In such an example embodiment, the song may be a data structure that signifies the song audio information. For example, the song may comprise information indicative a song title, a song type, an artist name, an artist image, an album title, an album cover, a genre, a production year, and/or the like, in addition to the song audio information. In such an example, the song audio information may be audio information that represents the content of the song. Such content of the song may comprise music content, audio effect content, voice content, and/or the like.

In many circumstances, once a song has been identified, the user of the apparatus may desire to be able to play the song by way of the user's electronic apparatus, store the song to listen to at a later time, and/or the like. As such, it may be desirable to configure the electronic apparatus such that the electronic apparatus may receive auditory information associated with the song, song audio information, and/or the like. In at least one example embodiment, an apparatus receives song audio information. The receipt of the song audio information may be based, at least in part, on the identification of the song. In at least one example embodiment, the apparatus receives the song audio information from a separate apparatus. For example, the apparatus may receive the song audio information from a server, a database, a music server, streaming music platform, a music database service, a song identification platform, a music recognition service, and/or the like. The apparatus may receive a file comprising the song audio information from the separate apparatus, a stream of song audio information from the separate apparatus, and/or the like. In such an example embodiment, the apparatus may cause storage of the song audio information received from the separate apparatus. For example, the apparatus may store the song audio information in at least one memory comprised by the apparatus, may send the song audio information to a different separate apparatus such that the different separate apparatus is caused to store the song audio information, and/or the like. As such, in at least one example embodiment, the apparatus receives the song audio information from at least one memory comprised by the apparatus. For example, the apparatus may retrieve the song audio information previously stored by the apparatus in the memory, may temporarily store the stream of song audio information received from the separate apparatus in at least one memory, and subsequently retrieve at least a portion of the stream of song audio information, and/or the like.

FIGS. 4A-4F are diagrams illustrating interaction with a song indicator according to at least one example embodiment. The examples of FIGS. 4A-4F are merely examples and do not limit the scope of the claims. For example, apparatus configuration may vary, song indicator configuration may vary, song rendering input may vary, and/or the like.

As discussed previously, in many circumstances, a user may be in an environment in which a song is being played. In such circumstances, the user may desire to be aware of certain information associated with the song, such as the title of the song, the artist of the song, and/or the like. As such, it may be desirable to configure an electronic apparatus such that the electronic apparatus may display information associated with one or more songs such that the user may perceive the information, interact with the song, cause rendering of the song, purchase the song, and/or the like. In at least one example embodiment, an apparatus causes display of, at least a portion of, a song indicator that represents the song. The song indicator may be a visual representation that is indicative of the song, representative of a characteristic of the song, indicative of one or more descriptors associated with the song, and/or the like. For example, the song indicator may be a shape, a play button, a song title, a song type, an artist name, an artist image, an album title, an album cover, a genre, a production year, and/or the like.

As previously discussed, in some circumstances, a user of an electronic apparatus may be in an environment in which a song is being played, in which two or more songs are being played, and/or the like. In such circumstances, the user may desire to be able to differentiate between each song that is being played. As such, it may be desirable to configure an electronic apparatus such that the electronic apparatus displays one or more song indicators in a manner that conveys the song indicator's association with a specific song that is being played in the environment. For example, a user may be in a location in which a song is being played to the left of the user, and a different song is being played to the right of the user. In such an example, the user may desire to listen to the entirety of the song that is being played to the left of the user, but may be unable to differentiate between the two songs, the two song indicators, and/or the like, as the user may lack knowledge of the name of the song, the artist of the song, and/or the like. As such, it may be desirable configure an electronic apparatus to cause display of one or more song indicators such that the user of the electronic apparatus may differentiate between the two songs, the two song indicators, and/or the like.

In at least one example embodiment, an apparatus causes display of a song indicator based, at least in part, on the direction of the microphone audio information. For example, causation of display of the song indicator may comprise display of the song indicator at a display position on a display. In such an example, the display position may be a position on the display that is in a display direction from the geometric center of the display. In such an example, the display direction, at least partially, corresponds with the direction of the microphone audio information. As such, the display position of the song indicator may be indicative of the direction of the microphone audio information. In this manner, the user of the apparatus may be able to distinguish between a song that is being played to the left of the user and a different song that is being played to the right of the user based, at least in part, on the display position of the song indicator associated with the song and the display position of the song indicator associated with the different song. For example, the song that is being played to the left of the user may be associated with a song indicator that is displayed on the left side of a display of the user's apparatus, in a display direction to the left of the geometric center of the display, in a display direction from the geometric center of the display that approximately corresponds with the direction of the microphone audio information, and/or the like. Similarly, for example, the song that is being played to the right of the user may be associated with a song indicator that is displayed on the right side of a display of the user's apparatus, in a display direction to the right of the geometric center of the display, in a display direction from the geometric center of the display that approximately corresponds with the direction of the microphone audio information, and/or the like.

Figure 4C:
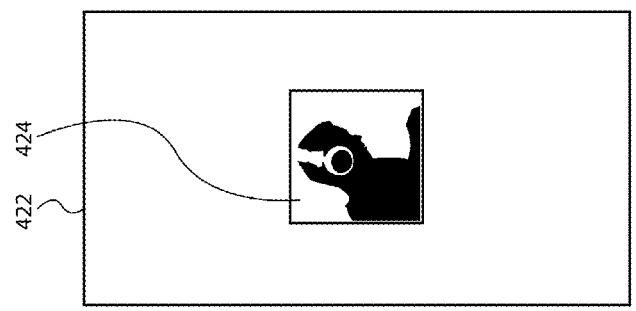
FIGS. 4A-4F are diagrams illustrating interaction with a song indicator according to at least one example embodiment.
Figure 4B:
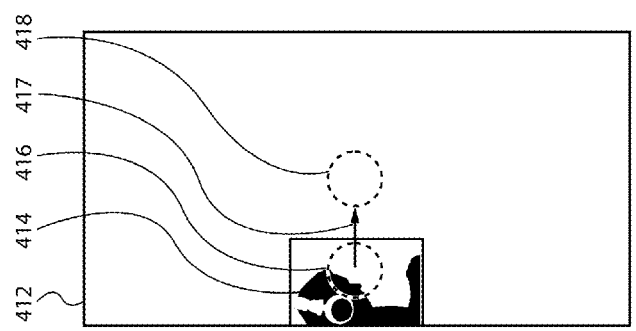
Figure 4A:
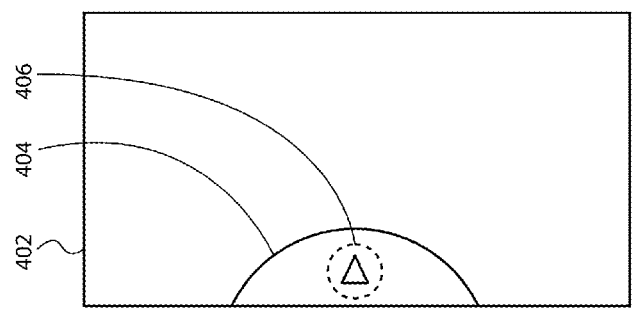

FIG. 4A is a diagram illustrating interaction with a song indicator according to at least one example embodiment. In the example of FIG. 4A, display 402 is displaying song indicator 404. In the example of FIG. 4A, song indicator 404 comprises a visual representation of a play symbol within a geometric shape. As can be seen, song indicator 404 is located on the left side of display 402, to the left of the geometric center of display 402, and/or the like. In this manner, FIG. 4A may correspond with the scenario illustrated in the example of FIG. 3A. In this manner, the display position of song indicator 404 may be based, at least in part, on the location of speaker 304 of FIG. 3A to the left of apparatus 302 of FIG. 3A. In this manner, a user of the apparatus may identify that the song represented by song indicator 404 corresponds with the song that is being played by speaker 304 of FIG. 3A.

In many circumstances, once a particular song has been identified by an electronic apparatus, a user of the electronic apparatus may desire to cause rendering of the song, interact with the song, and/or the like. As such, it may be desirable to configure the electronic apparatus such that the user of the electronic apparatus may cause rendering of a specific song identified by the electronic apparatus. In at least one example embodiment, an apparatus receives information indicative of a song rendering input in relation to the song indicator. The song rendering input may be an input that indicates a desire to cause rendering of the song that is represented by the song indicator.

In at least one example embodiment, the song rendering input is a tap input associated with the song indicator. For example, causation of display of the song indicator may comprise display of the song indicator at a display position on a display. In such an example, the tap input may be at a position on the display that corresponds with the display position of the song indicator on the display. In this manner, the tap input associated with the song indicator may indicate that the user desires to cause rendering of the song represented by the song indicator. For example, as depicted in the example of FIG. 4A, a tap input 406 is at a position on display 402 that corresponds with the display position of song indicator 404 on display 402. In such an example, tap input 406 may indicate that the user desires to cause rendering of the song represented by song indicator 404.

In at least one example embodiment, the song rendering input is a drag input. In such an example embodiment, the drag input may comprise a contact portion of the drag input, a movement portion of the drag input, and/or a release portion of the drag input. As discussed previously, causation of display of the song indicator may comprise display of the song indicator at a display position on a display. In such an example, the contact portion of the drag input may be at a position on the display that corresponds with the display position of the song indicator on the display. In such an example, the song indicator may be caused to be displayed such that at least a portion of the song indicator may be visible on the display of the apparatus. As such, a user that desires to cause rendering of the song represented by the song indicator may indicate such a desire by way of dragging the song indicator such that the indicator is entirely displayed on the display, towards the geometric center of the display, and/or the like. In at least one example embodiment, a movement portion of the drag input is associated with movement across the display towards a position on the display that approximately corresponds with a geometric center of the display. In at least one example embodiment, the release portion of the drag input is at a position on the display that approximately corresponds with a geometric center of the display. In this manner, the user may indicate the user's desire to cause rendering of the song represented by the song indicator by way of dragging the song indicator toward the center of the display of the user's apparatus, terminating the drag input at a position that approximately corresponds with the geometric center of the display, and/or the like. In at least one example embodiment, approximate correspondence refers to correspondence within a threshold tolerance that allows for deviation from an exact position that is consistent with a user's intent for the input to be at the position.

FIG. 4B is a diagram illustrating interaction with a song indicator according to at least one example embodiment. In the example of FIG. 4B, display 412 is displaying song indicator 414. In the example of FIG. 4B, song indicator 414 comprises a visual representation of an album cover, for example, an album cover that is associated with the song represented by song indicator 414. As can be seen, song indicator 414 is located on the left side of display 412, to the left of the geometric center of display 412, and/or the like. In this manner, FIG. 4B may correspond with the scenario illustrated in the example of FIG. 3A. In this manner, the display position of song indicator 414 may be based, at least in part, on the location of speaker 304 of FIG. 3A to the left of apparatus 302 of FIG. 3A. In this manner, a user of the apparatus may identify that the song represented by song indicator 414 corresponds with the song that is being played by speaker 304 of FIG. 3A. The example of FIG. 4B depicts a drag input that comprises contact portion 416, movement portion 417, and release portion 418. As can be seen, contact portion 416 is at a position on display 412 that corresponds with the display position of song indicator 414 on display 412. As can be seen, movement portion 417 corresponds with dragging of song indicator 414 towards the geometric center of display 412. As can be seen, release portion 418 is at a position on display 412 that approximately corresponds with a geometric center of display 412. In such an example, the drag input may indicate that the user desires to cause rendering of the song represented by song indicator 414.

FIG. 4C is a diagram illustrating a song indicator according to at least one example embodiment. In the example of FIG. 4C, display 422 is displaying song indicator 424. In at least one example embodiment, the example of FIG. 4C corresponds with the example of FIG. 4B subsequent to receipt of the drag input illustrated in the example of FIG. 4B. As can be see, song indicator 424 has been dragged from the display position illustrated by song indicator 414 in the example of FIG. 4B to the display position illustrated in the example of FIG. 4C.

Often times, a user of an electronic apparatus frequently and regularly utilizes the electronic apparatus for a myriad of purposes. For example, the user may manage the user's schedule, communicate with friends, seek out information, etc. by way of the user's electronic apparatus. As such, it may be desirable to cause display of a song indicator in a manner that avoids unnecessary obstruction of other display elements that may be displayed on the display of the electronic apparatus. In at least one example embodiment, a song indicator is displayed as an overlay. For example, the song indicator may be displayed over one or more display elements, such as a home screen, an application icon, and/or the like.

Figure 4F:
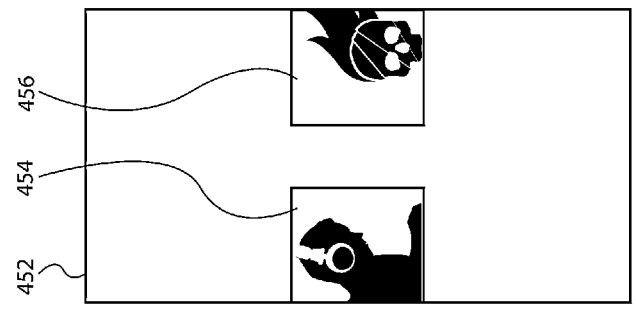
Figure 4E:
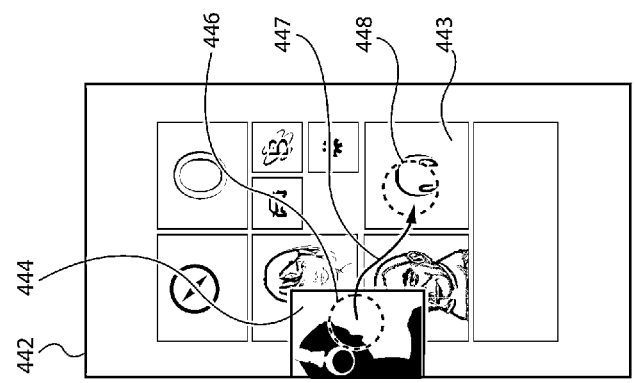
Figure 4D:
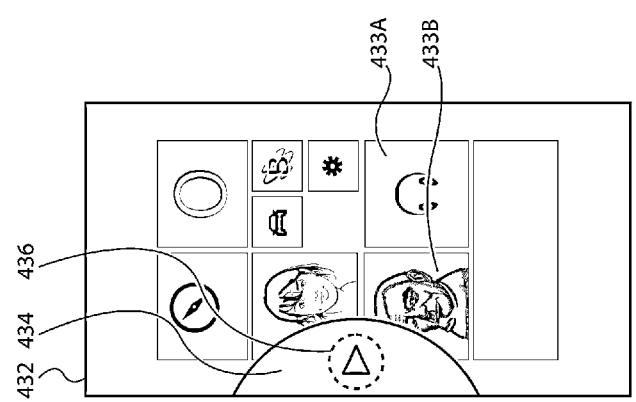

FIG. 4D is a diagram illustrating interaction with a song indicator according to at least one example embodiment. In the example of FIG. 4D, display 432 is displaying song indicator 434, display element 433A, and display element 433B. In the example of FIG. 4D, song indicator 434 comprises a visual representation of a play symbol within a geometric shape. In the example of FIG. 4D, song indicator 434 is displayed as an overlay. For example, song indicator 434 is displayed such that song indicator 434 overlays one or more display elements being displayed on display 432. For example, as illustrated, song indicator 434 overlays at least a portion of display element 433B.

As can be seen in the example of FIG. 4D, song indicator 434 is located on the left side of display 432, to the left of the geometric center of display 432, and/or the like. In this manner, FIG. 4D may correspond with the scenario illustrated in the example of FIG. 3A. In this manner, the display position of song indicator 434 may be based, at least in part, on the location of speaker 304 of FIG. 3A to the left of apparatus 302 of FIG. 3A. In this manner, a user of the apparatus may identify that the song represented by song indicator 434 corresponds with the song that is being played by speaker 304 of FIG. 3A. As depicted in the example of FIG. 4D, a tap input 436 is at a position on display 432 that corresponds with the display position of song indicator 434 on display 432. In such an example, tap input 436 may indicate that the user desires to cause rendering of the song represented by song indicator 434.

In some circumstances, a user may associate rendering of a song with a specific application, program, and/or the like. For example, the user may often utilize a particular music streaming application, media player software, etc. when listening to music, when playing a song, and/or the like. As such, it may be desirable to configure an electronic apparatus such that a user of the electronic apparatus may indicate the user's desire to cause rendering of a particular song in a manner that is easy and intuitive for the user. In at least one example embodiment, an apparatus causes display of a rendering indicator. The rendering indicator may be representative of a specific application, program, and/or the like, that is associated with rendering of a song. In such an example, a user may indicate the user's desire to cause rendering of a particular song by way of a drag input associated with a song indicator that represents the song. In such an example, the user may drag the song indicator to a position that is associated with the rendering indicator. For example, the contact portion of the drag input may be at a position on the display that corresponds with the display position of the song indicator on the display. In such an example, the movement portion of the drag input may be associated with movement across the display towards a position on the display that corresponds with a display position of the rendering apparatus. In at least one example embodiment, the release portion of the drag input is at a position on the display that corresponds with a rendering indicator.

FIG. 4E is a diagram illustrating interaction with a song indicator according to at least one example embodiment. In the example of FIG. 4E, display 442 is displaying song indicator 444 and display element 443. In the example of FIG. 4E, song indicator 444 comprises a visual representation of an album cover, for example, an album cover that is associated with the song represented by song indicator 444. In the example of FIG. 4E, song indicator 444 is displayed as an overlay. For example, song indicator 444 is displayed such that song indicator 444 overlays one or more display elements being displayed on display 442.

As can be seen in the example of FIG. 4E, song indicator 444 is located on the left side of display 442, to the left of the geometric center of display 442, and/or the like. In this manner, FIG. 4E may correspond with the scenario illustrated in the example of FIG. 3A. In this manner, the display position of song indicator 444 may be based, at least in part, on the location of speaker 304 of FIG. 3A to the left of apparatus 302 of FIG. 3A. In this manner, a user of the apparatus may identify that the song represented by song indicator 444 corresponds with the song that is being played by speaker 304 of FIG. 3A. The example of FIG. 4E depicts a drag input that comprises contact portion 446, movement portion 447, and release portion 448. As can be seen, contact portion 446 is at a position on display 442 that corresponds with the display position of song indicator 444 on display 442. As can be seen, movement portion 447 corresponds with dragging of song indicator 444 towards the geometric center of display 442. As can be seen, release portion 448 is at a position on display 442 that approximately corresponds with the display position of display element 443 on display 442. In the example of FIG. 4E, display element 443 is a rendering indicator associated with a music application, a music streaming service, and/or the like. In such an example, the drag input may indicate that the user desires to cause rendering of the song represented by song indicator 444.

As discussed previously, in some circumstances, two or more songs may be playing in the environment surrounding a user, the user's apparatus, and/or the like. As such, it may be desirable to cause rendering of song indicators that represent the two or more songs in a manner that allows a user to readily distinguish between the two songs, identify the song that the user desires to cause rendering of, and/or the like.

FIG. 4F is a diagram illustrating two song indicators according to at least one example embodiment. In the example of FIG. 4F, display 452 is displaying song indicator 454 and song indicator 456. In the example of FIG. 4F, song indicator 454 comprises a visual representation of an album cover, for example, an album cover that is associated with the song represented by song indicator 454. In the example of FIG. 4F, song indicator 456 comprises a visual representation of an album cover, for example, an album cover that is associated with the song represented by song indicator 456. As can be seen, song indicator 454 is located on the left side of display 452, to the left of the geometric center of display 452, and/or the like, and song indicator 456 is located on the right side of display 452, to the right of the geometric center of display 452, and/or the like. In this manner, FIG. 4F may correspond with the scenario illustrated in the example of FIG. 3B. In this manner, the display position of song indicator 454 may be based, at least in part, on the location of speaker 314 of FIG. 3B to the left of apparatus 312 of FIG. 3B. Similarly, the display position of song indicator 456 may be based, at least in part, on the location of speaker 316 of FIG. 3B to the right of apparatus 312 of FIG. 3B. In this manner, a user of the apparatus may identify that the song represented by song indicator 454 corresponds with the song that is being played by speaker 314 of FIG. 3B, and that the song represented by song indicator 456 corresponds with the song that is being played by speaker 316 of FIG. 3B.

Figure 5A:
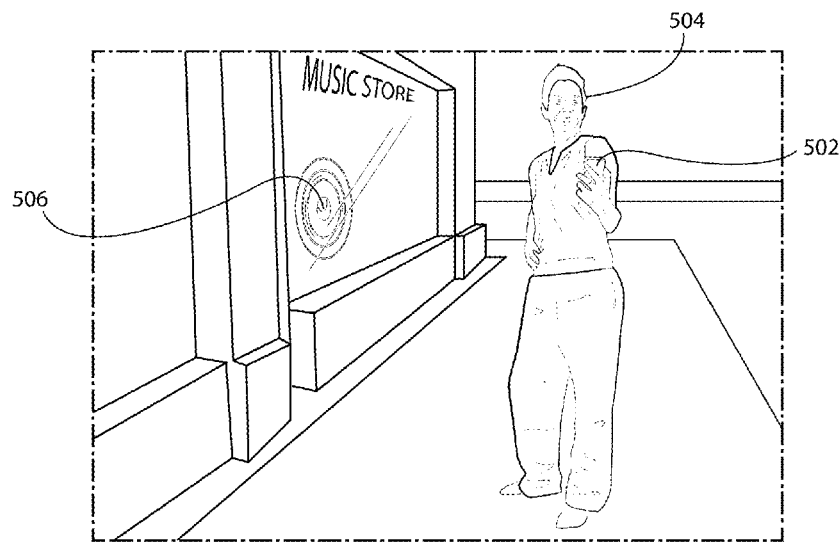
FIGS. 5A-5B are diagrams illustrating use of an apparatus according to at least one example embodiment.
Figure 5B:
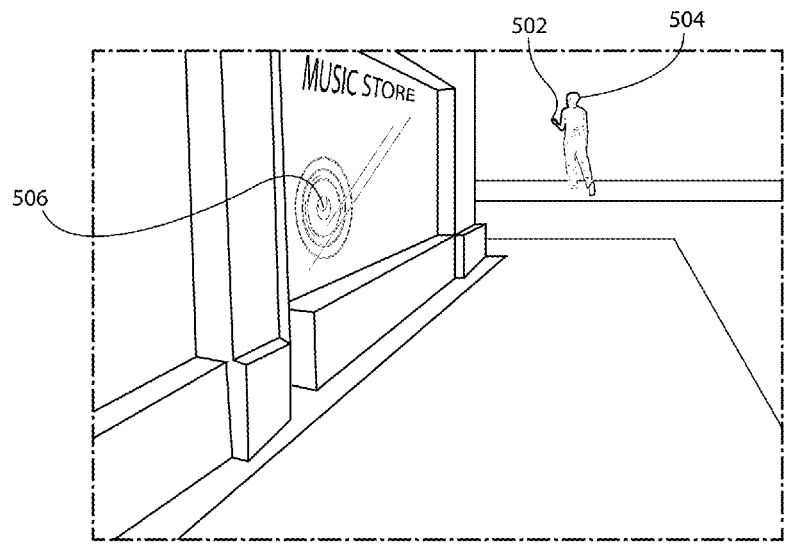

FIGS. 5A-5B are diagrams illustrating use of an apparatus according to at least one example embodiment. The examples of FIGS. 5A-5B are merely examples and do not limit the scope of the claims. For example, speaker location may vary, apparatus configuration may vary, apparatus orientation may vary, user location may vary, and/or the like.

In many circumstances, the user may desire to cause rendering of an identified song, a selected song, and/or the like. For example, the user may desire to continue listening to the song despite walking away from the location at which the user initially listened to the song. In at least one example embodiment, an apparatus causes rendering of the song audio information based, at least in part, on the song rendering input. Causation of rendering of the song audio information may comprise rendering of the song audio information by way of at least one speaker comprised by the apparatus, sending of the song audio information to another separate apparatus, such as a computer, a television, a separate speaker, a headset, a pair of earphones, etc., such that the other separate apparatus is caused to rendering the song audio information, and/or the like.

In many circumstances, it may be desirable to provide a seamless listening experience to a user of an electronic apparatus. For example, the user may be at a location at which the user is able to hear a song being played. In such an example, the user may wish to leave the particular location, but may desire to continue listening to the song. In such an example, the user may utilize the user's apparatus to identify the song and cause rendering of the song by way of a song rendering input associated with a song indicator that represents the song. In such an example, the user may be able to simultaneously hear the song being played in the environment and the song being rendered by the user's apparatus. As such, it may be desirable to provide the user with a fluid listening experience by way of synchronizing the rendering of the song audio information with the playing of the song in the environment. In at least one example embodiment, an apparatus determines a song timestamp that corresponds with a rendering position of the song with reference to the microphone audio information, such that the song timestamp identifies song timestamp audio information of the microphone audio information and song timestamp audio information of the song audio information. In such an example, causation of rendering of the song audio information may be performed such that the timestamp audio information of the song audio information is synchronized with the timestamp audio information of the microphone audio information. For example, the apparatus may determine that the song being played in the environment surrounding the apparatus is at a particular timestamp associated with the song, for example, 1:12 into the song. In such an example, the apparatus may cause rendering of the song audio information such that the song begins playback at 1:12, and is rendered synchronously with the song being played in the environment surrounding the apparatus.

In some circumstances, it may be desirable to ease a user's transition from listening to a song being played in the environment surrounding the user to listening to the song by way the causation of rendering of the song audio information. For example, the user may hear the song being played in the environment primarily by way of the user's left ear. In such an example, it may be desirable to avoid abruptly rendering the song audio information such that the user hears the song equally by way of both of the user's ears. In this manner, it may be desirable to ease the transition for the user. In at least one example embodiment, causation of rendering of the song audio information is based, at least in part, on the direction of the microphone audio information. For example, the direction of the microphone audio information may be to a side of the apparatus, and the rendering of the song audio information may comprise rendering of the song audio information by way of at least one speaker such that the rendering of the song audio information correlates with the side of the apparatus. In this manner, if the source of the audio associated with the song is to the left of the user, the apparatus may cause rendering of the song audio information such that the user perceives the song to be playing to the left of the user.

In order to ease the transition between listening to the song being played within the environment to the song being rendering by way of the user's apparatus, it may be desirable to slowly fade into stereo rendering based, at least in part, on a volume of the song being rendered in the environment. In at least one example embodiment, an apparatus determines a first magnitude of the microphone audio information. In such an example embodiment, the rendering of the song audio information may be based, at least in part, on the first magnitude. For example, a high first magnitude may indicate that the user is proximate to the source that is playing the song in the environment. As such, it may be desirable to cause rendering of the associated song audio information such that the user perceives the rendered song audio information to correspond with the source that is playing the song in the environment. In at least one example embodiment, an apparatus determines a second magnitude of the microphone audio information subsequent to the causation of rendering of the song audio information. In such an example embodiment, the apparatus may cause continuation of rendering of the song audio information based, at least in part, on the second magnitude. For example, in circumstances in which the first magnitude is greater than the second magnitude, the rendering of the song audio information may be a monophonic rendering, and the further rendering of the song audio information is a stereophonic rendering. In such an example, the apparatus may cause intermediate rendering of the song audio information subsequent to the rendering of the song audio information and prior to the further rendering of the song audio information such that the monophonic rendering transitions to the stereophonic rendering in proportion to a rendering transition duration. The transition to the stereophonic rendering may comprise an increase of rendering volume in a plurality of speakers in proportion to elapse of time during the rendering transition duration.

In some circumstances, a user listening to a song while walking away from the source that is playing the song in the environment may desire to listen to the song at a volume level that stays roughly consistent while the user moves further away from the source. In such circumstances, the volume associated with the source may diminish as the user moves further away from the source. As such, it may be desirable to increase the volume associated with rendering of the song audio information by way of the user's apparatus in order to compensate for the diminished volume associated with the source. For example, in some circumstances, the first magnitude may be greater than the second magnitude. In such circumstances, the rendering of the song audio information may be a lower volume rendering, and the further rendering of the song audio information may be a higher volume rendering.

FIG. 5A is a diagram illustrating use of an apparatus according to at least one example embodiment. In the example of FIG. 5A, user 504 is holding apparatus 502 while listening to a song being played by way of speaker 506. In the example of FIG. 5A, user 504 may cause apparatus 502 to identify, receive, and render song audio information that corresponds with the song being played by speaker 506. As can be seen in the example of FIG. 5A, user 504 is proximate to speaker 506. Due to the proximity of user 504 to speaker 506, the song being played by way of speaker 506 may be associated with a high volume. As such, apparatus 502 may be rendering the song audio information at a low volume. As can be seen, speaker 506 is to the right of apparatus 502 and user 504. As such, apparatus 502 may cause rendering of the song audio information in a monophonic manner that corresponds with the location of speaker 506 to the right of apparatus 502 and user 504. In this manner, user 504 may perceive the song audio information to be associated with speaker 506, thus enhancing the listening experience of user 504.

FIG. 5B is a diagram illustrating use of an apparatus according to at least one example embodiment. The example of FIG. 5B corresponds with the example of FIG. 5A subsequent to user 504 walking away from speaker 506. As can be seen, user 504 has walked down the sidewalk and cross the street. In this manner, user 504 may no longer be able to hear the song being played by speaker 506. In the example of FIG. 5B, apparatus 502 may have caused transitioning of rendering of the song audio information from a monophonic rendering to a stereophonic rendering, may have increased the volume associated with rendering of the song audio information in order to compensate for the diminished volume associated with speaker 506, and/or the like.

Figure 6:
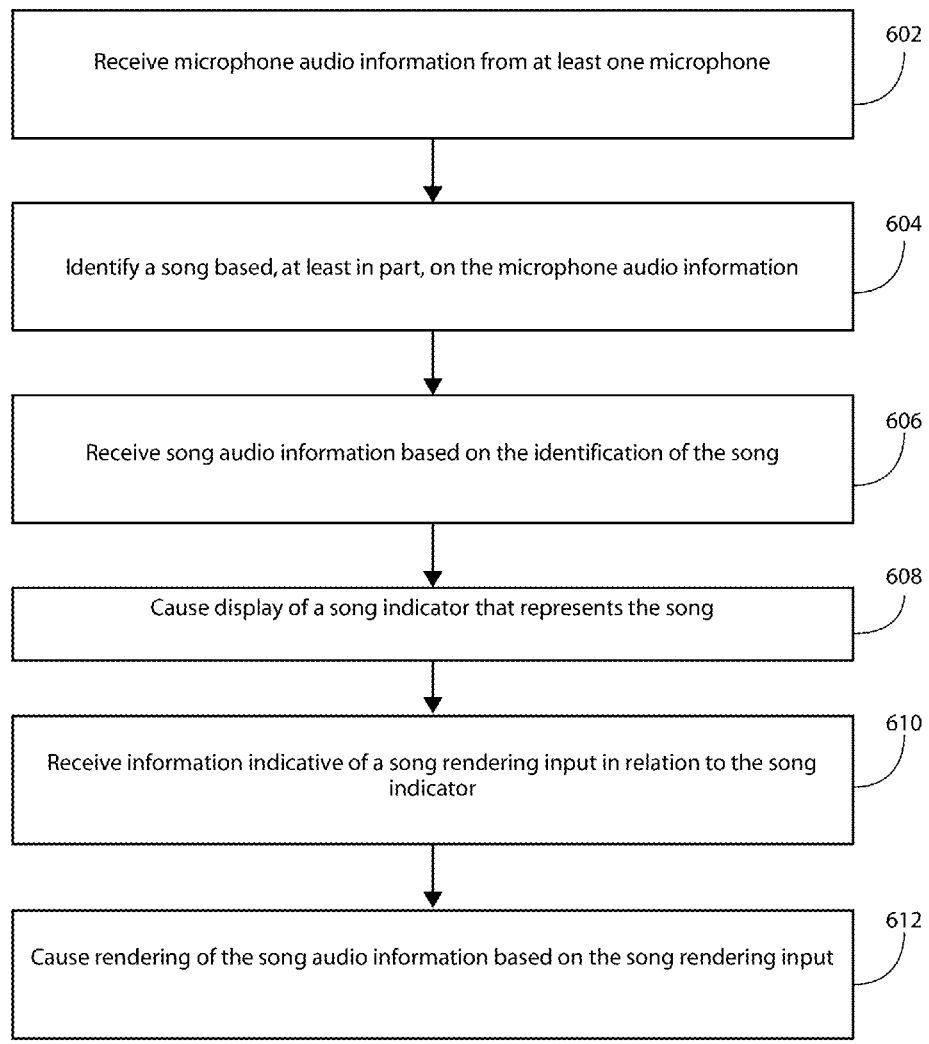
FIG. 6 is a flow diagram illustrating activities associated with causation of rendering of song audio information according to at least one example embodiment.

FIG. 6 is a flow diagram illustrating activities associated with causation of rendering of song audio information according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus receives microphone audio information from at least one microphone. The receipt, the microphone audio information, and the microphone may be similar as described regarding FIGS. 2A-2C and FIGS. 3A-3B.

At block 604, the apparatus identifies a song based, at least in part, on the microphone audio information. The identification and the song may be similar as described regarding FIGS. 2A-2C, FIGS. 3A-3B, and FIGS. 4A-4F.

At block 606, the apparatus receives song audio information based, at least in part, on the identification of the song. The receipt and the song audio information may be similar as described regarding FIGS. 2A-2C, FIGS. 3A-3B, and FIGS. 4A-4F.

At block 608, the apparatus causes display of, at least a portion of, a song indicator that represents the song. The causation of display and the song indicator may be similar as described regarding FIGS. 2A-2C, FIGS. 3A-3B, and FIGS. 4A-4F.

At block 610, the apparatus receives information indicative of a song rendering input in relation to the song indicator. The receipt and the song rendering input may be similar as described regarding FIGS. 4A-4F.

At block 612, the apparatus causes rendering of the song audio information based, at least in part, on the song rendering input. The causation of rendering may be similar as described regarding FIGS. 2A-2C, FIGS. 3A-3B, FIGS. 4A-4F, and FIGS. 5A-5B.

Figure 7:
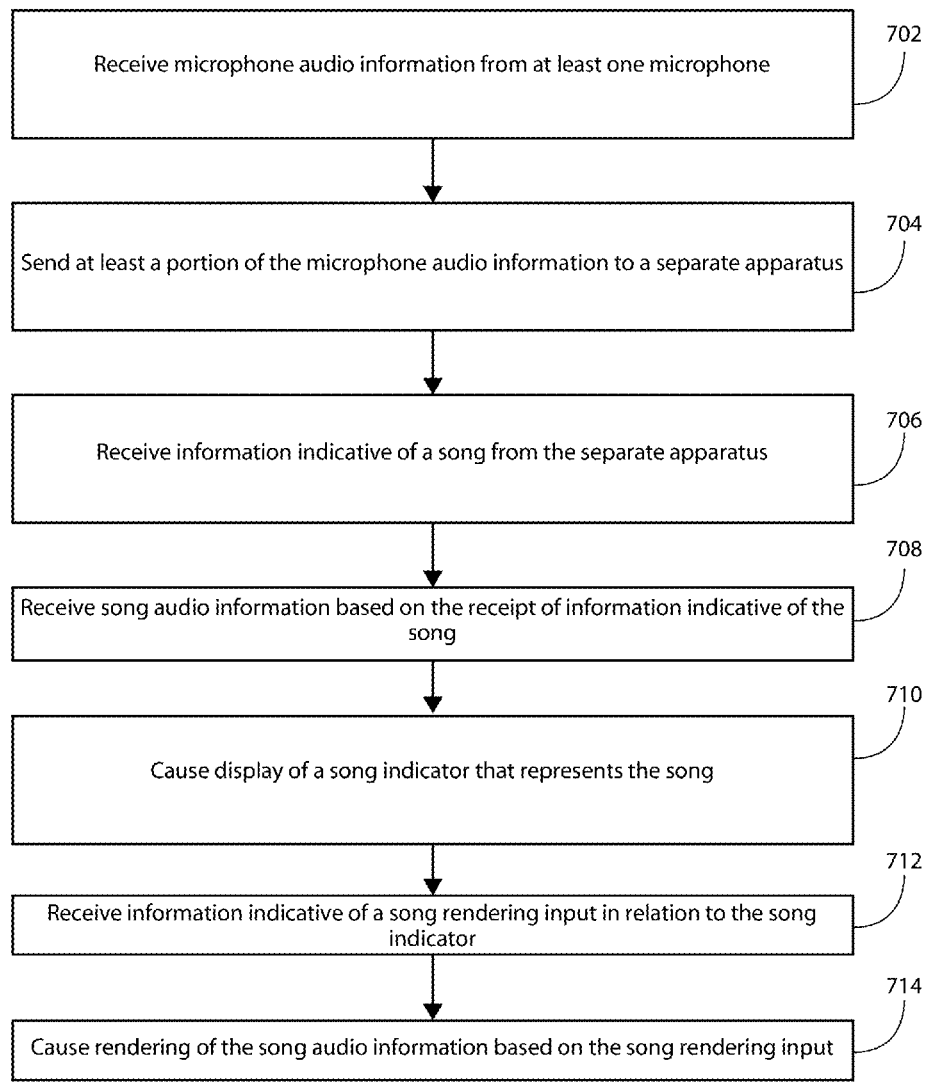
FIG. 7 is a flow diagram illustrating activities associated with causation of rendering of song audio information according to at least one example embodiment.

FIG. 7 is a flow diagram illustrating activities associated with causation of rendering of song audio information according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As discussed previously, in many circumstances, it may be desirable to identify a song by way of a separate apparatus, for example, a server, a database, a music server, streaming music platform, a music database service, a song identification platform, a music recognition service, and/or the like. For example, the apparatus may send at least a portion of the microphone audio information to the separate apparatus, and may receive information indicative of the song from the separate apparatus.

At block 702, the apparatus receives microphone audio information from at least one microphone. The receipt, the microphone audio information, and the microphone may be similar as described regarding FIGS. 2A-2C and FIGS. 3A-3B.

At block 704, the apparatus sends, at least a portion of, the microphone audio information to a separate apparatus. The sending of the microphone audio information and the separate apparatus may be similar as described regarding FIGS. 2A-2C, FIGS. 3A-3B, and FIGS. 4A-4F.

At block 706, the apparatus receives information indicative of a song from the separate apparatus. The receipt and the song may be similar as described regarding FIGS. 2A-2C, FIGS. 3A-3B, and FIGS. 4A-4F.

At block 708, the apparatus receives song audio information based, at least in part, on the receipt of information indicative of the song. The receipt and the song audio information may be similar as described regarding FIGS. 2A-2C, FIGS. 3A-3B, and FIGS. 4A-4F.

At block 710, the apparatus causes display of, at least a portion of, a song indicator that represents the song. The causation of display and the song indicator may be similar as described regarding FIGS. 2A-2C, FIGS. 3A-3B, and FIGS. 4A-4F.

At block 712, the apparatus receives information indicative of a song rendering input in relation to the song indicator. The receipt and the song rendering input may be similar as described regarding FIGS. 4A-4F.

At block 714, the apparatus causes rendering of the song audio information based, at least in part, on the song rendering input. The causation of rendering may be similar as described regarding FIGS. 2A-2C, FIGS. 3A-3B, FIGS. 4A-4F, and FIGS. 5A-5B.

Figure 8:
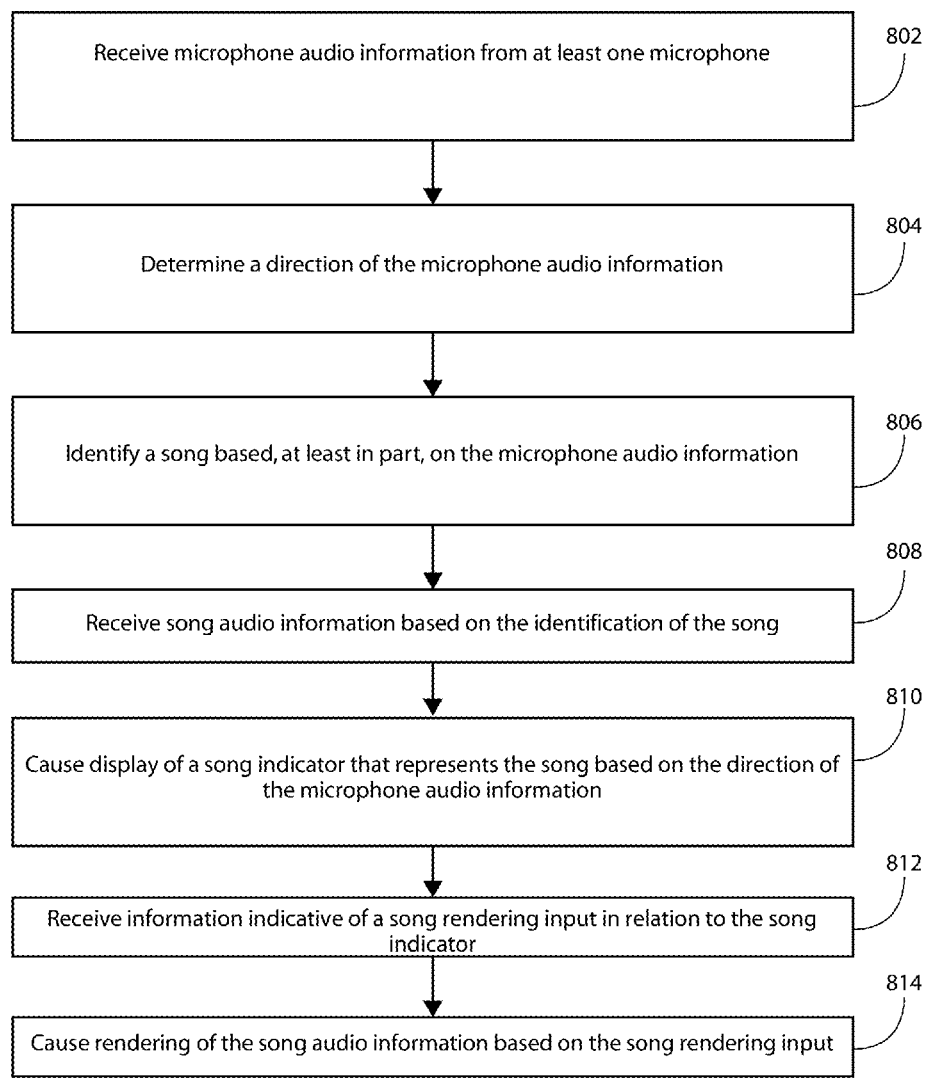
FIG. 8 is a flow diagram illustrating activities associated with causation of rendering of song audio information according to at least one example embodiment.

FIG. 8 is a flow diagram illustrating activities associated with causation of rendering of song audio information according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in many circumstances, it may be desirable to determine a direction associated with the received microphone audio information. For example, for purposes relating to display of the song indicator based, at least in part, on the direction of the microphone audio information.

At block 802, the apparatus receives microphone audio information from at least one microphone. The receipt, the microphone audio information, and the microphone may be similar as described regarding FIGS. 2A-2C and FIGS. 3A-3B.

At block 804, the apparatus determines a direction of the microphone audio information. The determination and the direction of the microphone audio information may be similar as described regarding FIGS. 2A-2C, FIGS. 3A-3B, FIGS. 4A-4F, and FIGS. 5A-5B.

At block 806, the apparatus identifies a song based, at least in part, on the microphone audio information. The identification and the song may be similar as described regarding FIGS. 2A-2C, FIGS. 3A-3B, and FIGS. 4A-4F.

At block 808, the apparatus receives song audio information based, at least in part, on the identification of the song. The receipt and the song audio information may be similar as described regarding FIGS. 2A-2C, FIGS. 3A-3B, and FIGS. 4A-4F.

At block 810, the apparatus causes display of, at least a portion of, a song indicator that represents the song based, at least in part, on the direction of the microphone audio information. The causation of display and the song indicator may be similar as described regarding FIGS. 2A-2C, FIGS. 3A-3B, and FIGS. 4A-4F.

At block 812, the apparatus receives information indicative of a song rendering input in relation to the song indicator. The receipt and the song rendering input may be similar as described regarding FIGS. 4A-4F.

At block 814, the apparatus causes rendering of the song audio information based, at least in part, on the song rendering input. The causation of rendering may be similar as described regarding FIGS. 2A-2C, FIGS. 3A-3B, FIGS. 4A-4F, and FIGS. 5A-5B.

Figure 9:
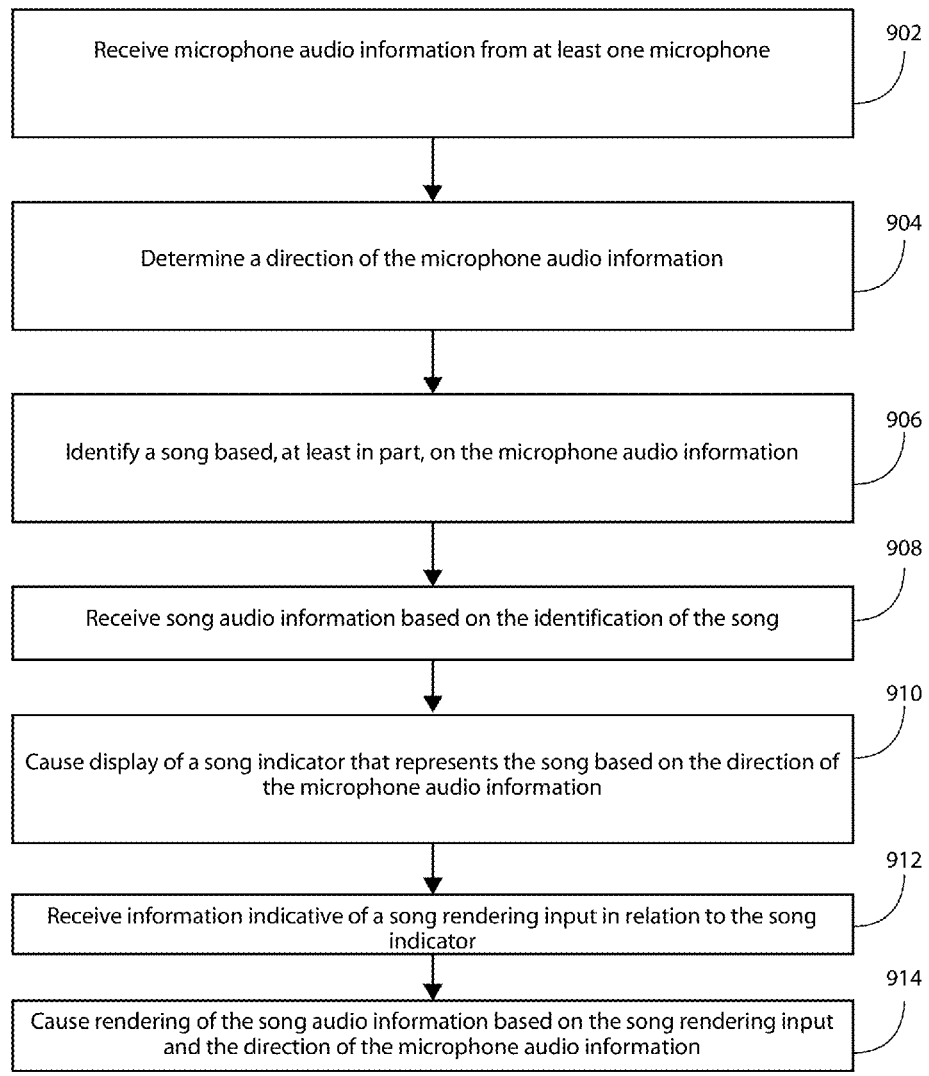
FIG. 9 is a flow diagram illustrating activities associated with causation of rendering of song audio information according to at least one example embodiment.

FIG. 9 is a flow diagram illustrating activities associated with causation of rendering of song audio information according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in many circumstances, it may be desirable to determine a direction associated with the received microphone audio information. For example, for purposes relating to display of the song indicator based, at least in part, on the direction of the microphone audio information, rendering of the song audio information based, at least in part, on the direction of the microphone audio information, and/or the like.

At block 902, the apparatus receives microphone audio information from at least one microphone. The receipt, the microphone audio information, and the microphone may be similar as described regarding FIGS. 2A-2C and FIGS. 3A-3B.

At block 904, the apparatus determines a direction of the microphone audio information. The determination and the direction of the microphone audio information may be similar as described regarding FIGS. 2A-2C, FIGS. 3A-3B, FIGS. 4A-4F, and FIGS. 5A-5B.

At block 906, the apparatus identifies a song based, at least in part, on the microphone audio information. The identification and the song may be similar as described regarding FIGS. 2A-2C, FIGS. 3A-3B, and FIGS. 4A-4F.

At block 908, the apparatus receives song audio information based, at least in part, on the identification of the song. The receipt and the song audio information may be similar as described regarding FIGS. 2A-2C, FIGS. 3A-3B, and FIGS. 4A-4F.

At block 910, the apparatus causes display of, at least a portion of, a song indicator that represents the song based, at least in part, on the direction of the microphone audio information. The causation of display and the song indicator may be similar as described regarding FIGS. 2A-2C, FIGS. 3A-3B, and FIGS. 4A-4F.

At block 912, the apparatus receives information indicative of a song rendering input in relation to the song indicator. The receipt and the song rendering input may be similar as described regarding FIGS. 4A-4F.

At block 914, the apparatus causes rendering of the song audio information based, at least in part, on the song rendering input and the direction of the microphone audio information. The causation of rendering may be similar as described regarding FIGS. 2A-2C, FIGS. 3A-3B, FIGS. 4A-4F, and FIGS. 5A-5B.

Figure 10:
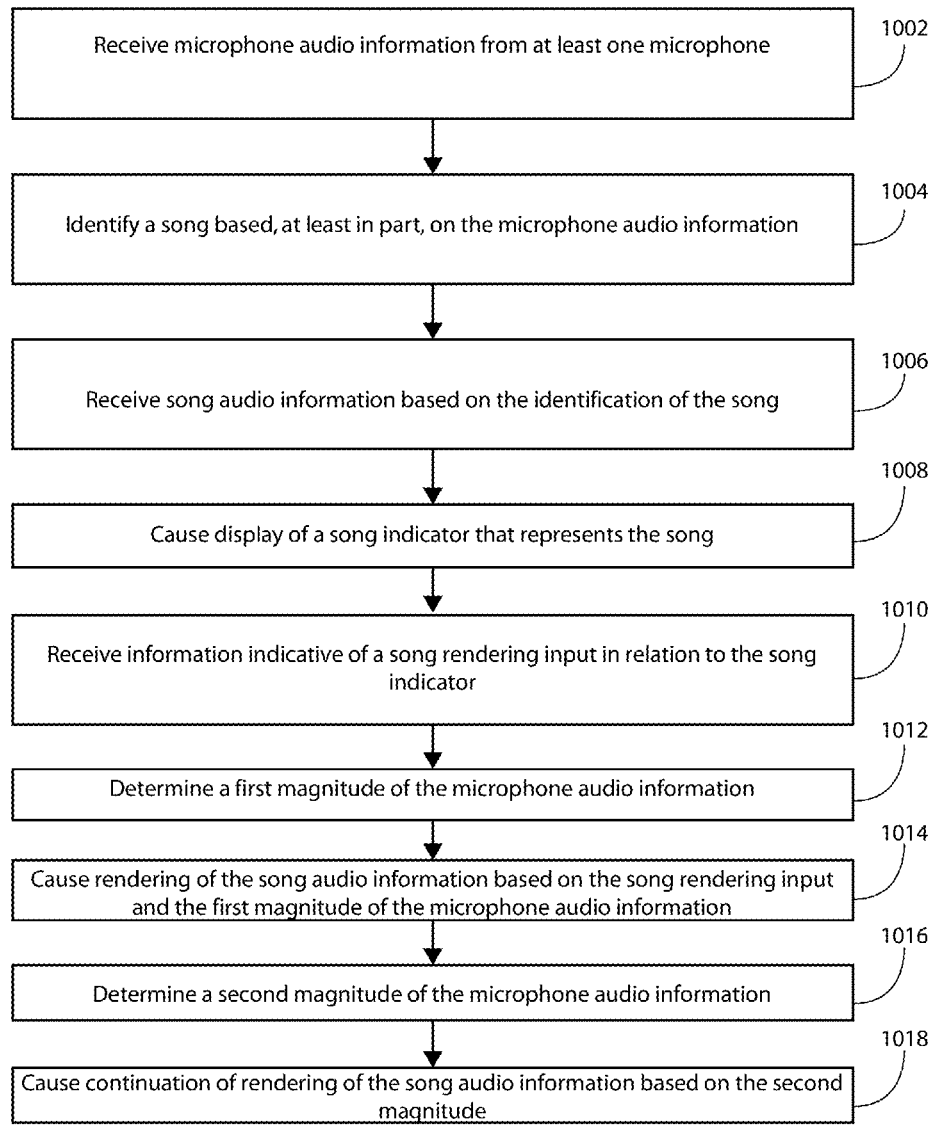
FIG. 10 is a flow diagram illustrating activities associated with causation of rendering of song audio information according to at least one example embodiment.

FIG. 10 is a flow diagram illustrating activities associated with causation of rendering of song audio information according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

As discussed previously, in many circumstances, it may be desirable to adjust one or more characteristics associated with rendering of the song audio information based, at least in part, on a magnitude of the microphone audio information.

At block 1002, the apparatus receives microphone audio information from at least one microphone. The receipt, the microphone audio information, and the microphone may be similar as described regarding FIGS. 2A-2C and FIGS. 3A-3B.

At block 1004, the apparatus identifies a song based, at least in part, on the microphone audio information. The identification and the song may be similar as described regarding FIGS. 2A-2C, FIGS. 3A-3B, and FIGS. 4A-4F.

At block 1006, the apparatus receives song audio information based, at least in part, on the identification of the song. The receipt and the song audio information may be similar as described regarding FIGS. 2A-2C, FIGS. 3A-3B, and FIGS. 4A-4F.

At block 1008, the apparatus causes display of, at least a portion of, a song indicator that represents the song. The causation of display and the song indicator may be similar as described regarding FIGS. 2A-2C, FIGS. 3A-3B, and FIGS. 4A-4F.

At block 1010, the apparatus receives information indicative of a song rendering input in relation to the song indicator. The receipt and the song rendering input may be similar as described regarding FIGS. 4A-4F.

At block 1012, the apparatus determines a first magnitude of the microphone audio information. The determination and the first magnitude may be similar as described regarding FIGS. 2A-2C, FIGS. 3A-3B, FIGS. 4A-4F, and FIGS. 5A-5B.

At block 1014, the apparatus causes rendering of the song audio information based, at least in part, on the song rendering input and the first magnitude of the microphone audio information. The causation of rendering may be similar as described regarding FIGS. 2A-2C, FIGS. 3A-3B, FIGS. 4A-4F, and FIGS. 5A-5B.

At block 1016, the apparatus determines a second magnitude of the microphone audio information subsequent to the causation of rendering of the song audio information. The determination and the second magnitude may be similar as described regarding FIGS. 2A-2C, FIGS. 3A-3B, FIGS. 4A-4F, and FIGS. 5A-5B.

At block 1018, the apparatus causes continuation of rendering of the song audio information based, at least in part, on the second magnitude. The causation of continuation of rendering may be similar as described regarding FIGS. 2A-2C, FIGS. 3A-3B, FIGS. 4A-4F, and FIGS. 5A-5B.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 606 of FIG. 6 may be performed after block 608 of FIG. 6. In another example, block 606 of FIG. 6 may be performed after block 610 of FIG. 6. Furthermore, if desired, one or more of the above-described functions may be optional or may be combined. For example, block 706 of FIG. 7 may be optional and/or combined with block 708 of FIG. 7.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method comprising:
   receiving microphone audio information from at least one microphone comprised by an apparatus;
   identifying a song based, at least in part, on the microphone audio information;
   receiving song audio information based, at least in part, on the identification of the song;
   causing display of, at least a portion of, a song indicator that represents the song;
   receiving information indicative of a song rendering input in relation to the song indicator;
   determining a first distance between the apparatus and a source that is rendering the song;
   while the source is rendering the song, causing, by the apparatus, rendering of the song audio information based, at least in part, on the song rendering input and the first distance;
   determining a second distance between the apparatus and the source; and
   while the source is rendering the song, causing, by the apparatus and in response to the second distance between the apparatus and the source, continuation of rendering of the song audio information, and adjusting volume of the song audio information being rendered.

2. The method of claim 1, further comprising determining a song timestamp that corresponds with a rendering position of the song with reference to the microphone audio information, such that the song timestamp identifies song timestamp audio information of the microphone audio information and song timestamp audio information of the song audio information.

3. The method of claim 2, wherein the causation of rendering of the song audio information is performed such that the timestamp audio information of the song audio information is synchronized with the timestamp audio information of the microphone audio information.

4. The method of claim 1, further comprising determining a direction of the microphone audio information, wherein the causation of display of the song indicator is based, at least in part, on the direction of the microphone audio information.

5. The method of claim 4, wherein the determination of the direction of the microphone audio information comprises determining the direction of the microphone audio information based, at least in part, on correlation between audio information associated with a plurality of microphones at different positions on the apparatus.

6. The method of claim 4, wherein the causation of display of the song indicator comprises displaying the song indicator at a display position on a display, the display position being a position on the display that is in a display direction from a geometric center of the display, and the display direction being a direction that, at least partially, corresponds with the direction of the microphone audio information.

7. The method of claim 1, further comprising:
   determining a first magnitude of the microphone audio information, wherein the determination of the first distance between the apparatus and the source that is rendering the song is based, at least in part, on the first magnitude; and
   determining a second magnitude of the microphone audio information subsequent to the causation of rendering of the song audio information, wherein the determination of the second distance between the apparatus and the source that is rendering the song is based, at least in part, on the second magnitude.

8. The method of claim 7, wherein the first magnitude is greater than the second magnitude, the rendering of the song audio information is a monophonic rendering, the continuation of rendering of the song audio information is a stereophonic rendering, and further comprising causing intermediate rendering of the song audio information subsequent to the rendering of the song audio information and prior to the continuation of rendering of the song audio information, the intermediate rendering being performed such that the monophonic rendering transitions to the stereophonic rendering in proportion to a rendering transition duration.

9. The method of claim 7, wherein the determination of the first distance between the apparatus and the source that is rendering the song is based solely on the first magnitude of the microphone audio information, and the determination of the second distance between the apparatus and the source that is rendering the song is based solely on the second magnitude of the microphone audio information.

10. The method of claim 1, further comprising:
causing, by the apparatus, continuation of rendering of the song audio information based, at least in part, on a third distance at which a user of the apparatus no longer hears the song rendered by the source.

11. An apparatus, comprising:
a processor;
memory including computer program code, the memory and the computer program code configured to, working with the processor, cause the apparatus to perform at least the following:
receipt of microphone audio information from at least one microphone comprised by the apparatus;
identification of a song based, at least in part, on the microphone audio information;
receipt of song audio information based, at least in part, on the identification of the song;
causation of display of, at least a portion of, a song indicator that represents the song;
receipt of information indicative of a song rendering input in relation to the song indicator;
determination of a first distance between the apparatus and a source that is rendering the song;
while the source is rendering the song, causation of rendering of the song audio information based, at least in part, on the song rendering input and the first distance;
determination of a second distance between the apparatus and the source; and
while the source is rendering the song, in response to the second distance between the apparatus and the source, causation of continuation of rendering of the song audio information and causation of adjustment of volume of the song audio information being rendered.

12. The apparatus of claim 11, wherein the memory includes computer program code configured to, working with the processor, cause the apparatus to perform determination of a song timestamp that corresponds with a rendering position of the song with reference to the microphone audio information, such that the song timestamp identifies song timestamp audio information of the microphone audio information and song timestamp audio information of the song audio information.

13. The apparatus of claim 12, wherein the causation of rendering of the song audio information is performed such that the timestamp audio information of the song audio information is synchronized with the timestamp audio information of the microphone audio information.

14. The apparatus of claim 11, wherein the memory includes computer program code configured to, working with the processor, cause the apparatus to perform determination of a direction of the microphone audio information, wherein the causation of display of the song indicator is based, at least in part, on the direction of the microphone audio information.

15. The apparatus of claim 14, wherein the determination of the direction of the microphone audio information comprises determining the direction of the microphone audio information based, at least in part, on correlation between audio information associated with a plurality of microphones at different positions on the apparatus.

16. The apparatus of claim 14, wherein the causation of display of the song indicator comprises displaying the song indicator at a display position on a display, the display position being a position on the display that is in a display direction from the geometric center of the display, and the display direction being a direction that, at least partially, corresponds with the direction of the microphone audio information.

17. The apparatus of claim 11, wherein the memory includes computer program code configured to, working with the processor, cause the apparatus to perform:
determination of a first magnitude of the microphone audio information, wherein the determination of the first distance between the apparatus and the source that is rendering the song is based, at least in part, on the first magnitude; and
determination of a second magnitude of the microphone audio information subsequent to the causation of rendering of the song audio information, wherein the determination of the second distance between the apparatus and the source that is rendering the song is based, at least in part, on the second magnitude.

18. The apparatus of claim 17, wherein the first magnitude is greater than the second magnitude, the rendering of the song audio information is a monophonic rendering, the continuation of rendering of the song audio information is a stereophonic rendering, and the memory includes computer program code configured to, working with the processor, cause the apparatus to perform causation of intermediate rendering of the song audio information subsequent to the rendering of the song audio information and prior to the continuation of rendering of the song audio information, the intermediate rendering being performed such that the monophonic rendering transitions to the stereophonic rendering in proportion to a rendering transition duration.

19. The apparatus of claim 17, wherein the determination of the first distance between the apparatus and the source that is rendering the song is based solely on the first magnitude of the microphone audio information, and the determination of the second distance between the apparatus and the source that is rendering the song is based solely on the second magnitude of the microphone audio information.

20. At least one non-transitory computer-readable medium encoded with instructions that, when executed by a processor of an apparatus, perform:
receipt of microphone audio information from at least one microphone comprised by the apparatus;
identification of a song based, at least in part, on the microphone audio information;
receipt of song audio information based, at least in part, on the identification of the song;

causation of display of, at least a portion of, a song indicator that represents the song;

receipt of information indicative of a song rendering input in relation to the song indicator;

determination of a first distance between the apparatus and a source that is rendering the song;

while the source is rendering the song, causation, by the apparatus, of rendering of the song audio information based, at least in part, on the song rendering input and the first distance;

determination of a second distance between the apparatus and the source; and while the source is rendering the song and in response to the second distance between the apparatus and the source, causation, by the apparatus, of continuation of rendering of the song audio information, and causation, by the apparatus, of adjustment of volume of the song audio information being rendered.

21. The medium of claim 20, further encoded with instructions that, when executed by a processor, perform:

determination of a first magnitude of the microphone audio information, wherein the determination of the first distance between the apparatus and the source that is rendering the song is based, at least in part, on the first magnitude; and determination of a second magnitude of the microphone audio information subsequent to the causation of rendering of the song audio information, wherein the determination of the second distance between the apparatus and the source that is rendering the song is based, at least in part, on the second magnitude.

* * * * *